United States Patent [19]

Sawatsky

[11] Patent Number: 5,371,925
[45] Date of Patent: Dec. 13, 1994

[54] BAG SEALING ASSEMBLY

[76] Inventor: Kim R. Sawatsky, 13014 Dixie Road, Brampton, Ontario, Canada, L6T 3S1

[21] Appl. No.: 51,216

[22] Filed: Apr. 23, 1993

[51] Int. Cl.$^5$ .......................... B65D 77/10; A41F 1/00
[52] U.S. Cl. .................... 24/30.5 R; 24/460; 24/399
[58] Field of Search .................. 24/716, 587, 399, 400, 24/461, 462, 30.5 R; 312/1, 245

[56] References Cited

U.S. PATENT DOCUMENTS

| | | | |
|---|---|---|---|
| D. 301,548 | 6/1989 | Weaver | D9/434 |
| 2,599,738 | 6/1952 | Ames | 24/30.5 R |
| 3,141,221 | 11/1962 | Faulls, Jr. | 24/30.5 |
| 3,266,711 | 5/1965 | Song | 229/62 |
| 3,621,539 | 11/1971 | Ayers | 24/30.5 |
| 3,803,671 | 4/1974 | Stuppy et al. | 24/460 X |
| 4,103,401 | 8/1978 | Conley | 24/462 X |
| 4,107,826 | 8/1978 | Tysdal | 24/460 X |
| 4,534,089 | 8/1985 | Swan | 24/559 |
| 4,783,129 | 11/1988 | Jacobson | 312/1 |
| 5,048,785 | 9/1991 | Shaw et al. | 24/460 X |
| 5,203,055 | 4/1993 | Broadwater | 24/460 X |

Primary Examiner—Edward K. Look
Assistant Examiner—Hoang Nguyen
Attorney, Agent, or Firm—Dowell & Dowell

[57] ABSTRACT

A mechanical bag closure and sealing assembly which includes inner and outer elongated inter-engaging clamp members between which the upper edges of a bag are selectively compressed and sealed and wherein the inner member includes opposing wall segments which are compressible to reduce the effective cross section thereof upon application of pressure to opposing flanges extending on opposite sides thereof to thereby facilitate insertion and removal of the inner member with respect to the outer member. In alternate embodiments, the base of the outer member includes a channel for receiving indicia and/or for receiving a magnet for facilitating mounting of the assembly to metallic surfaces. In other embodiments, the assembly may be mounted within tracks secured to cabinets or walls.

20 Claims, 3 Drawing Sheets

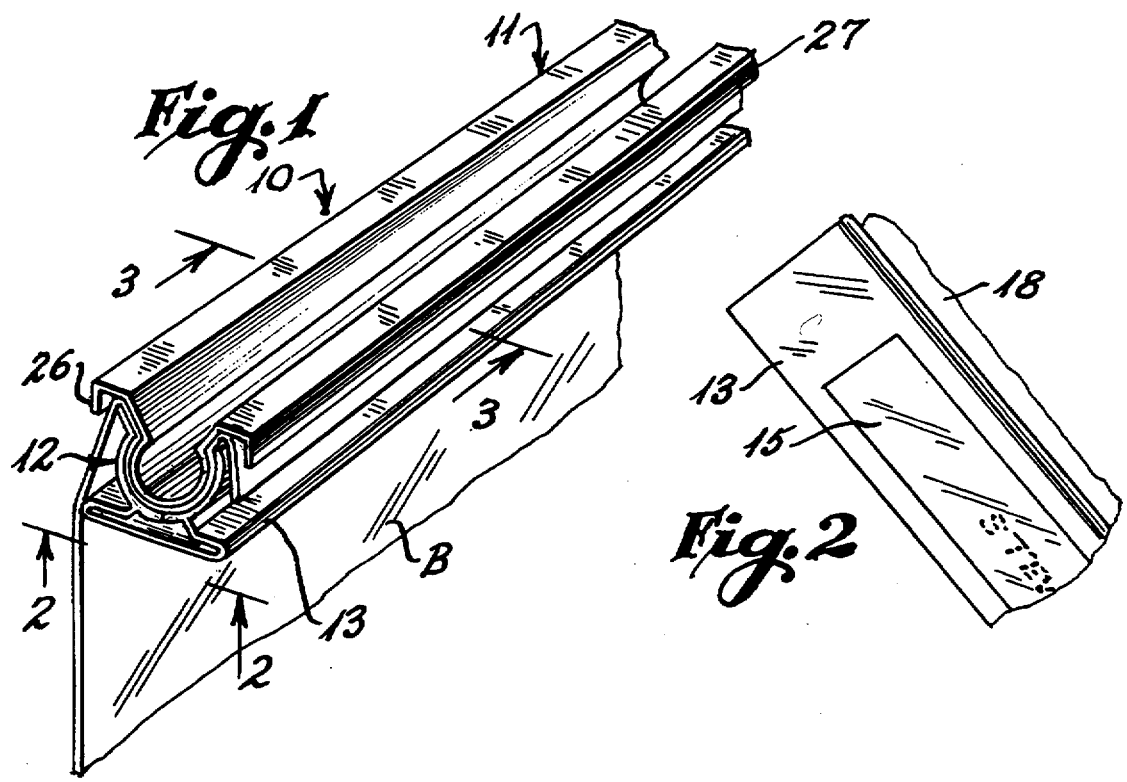
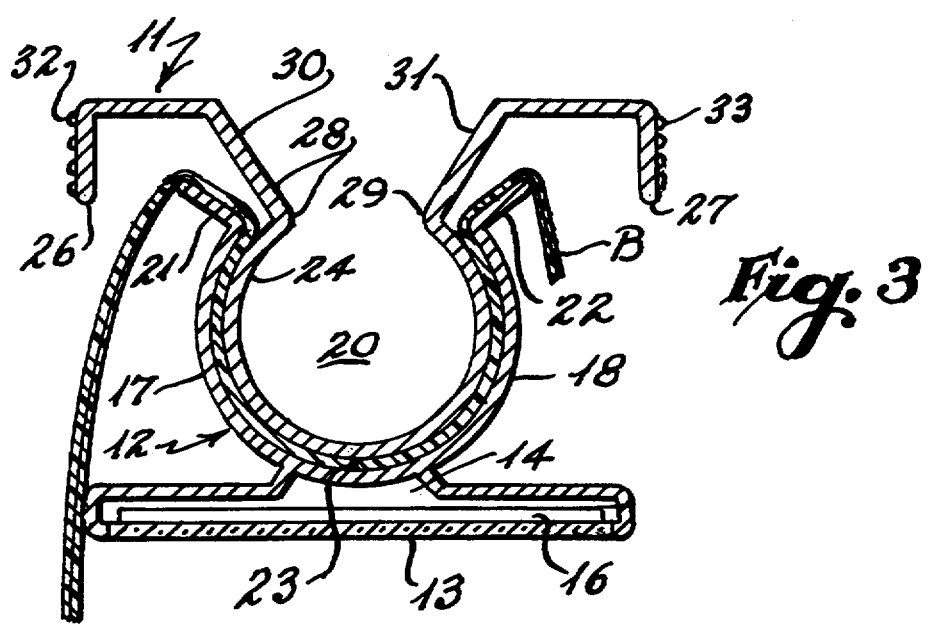

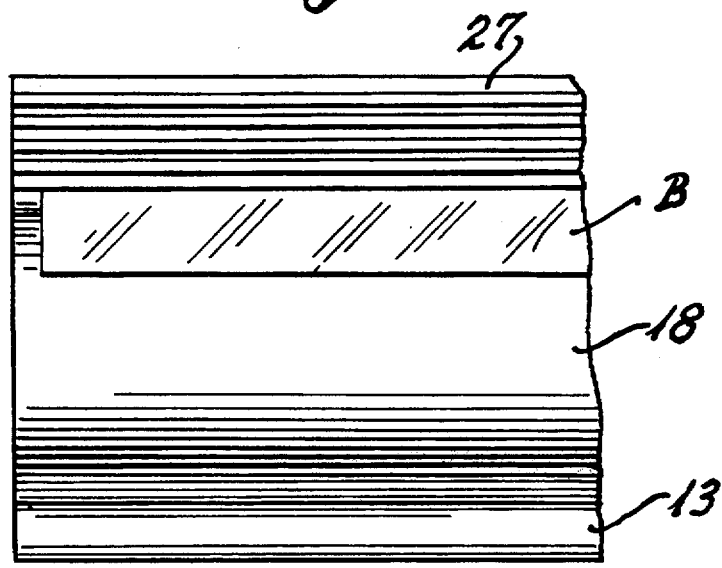
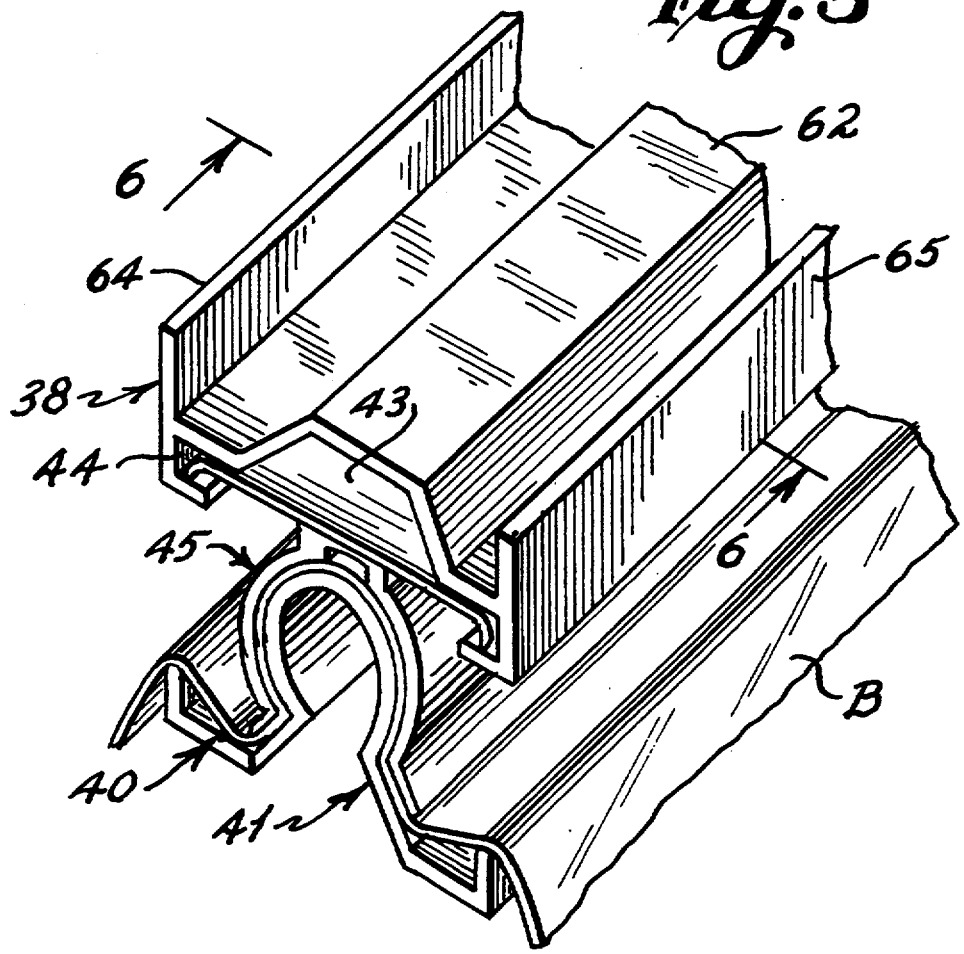

BAG SEALING ASSEMBLY

BACKGROUND OF THE INVENTION

1. Field of the Invention

This invention is generally directed to devices for sealing opposing flexible sheets or bags by clamping the sheet material between inter-engaging clamp members. More specifically, the invention is directed to providing uniquely configured inter-engaging clamp members wherein the outer member is configured to frictionally receive an elongated inner member so as to compress and seal the material therebetween and wherein the inner member includes opposing wall segments which are compressible relative to one another to thereby reduce the effective cross section of the inner member by application of pressure to opposing flanges which are provided on either side of the opening between the opposing wall segments thereof. In the preferred embodiment, the opposing flanges which are utilized to compress the inner clamp member are connected to the compressible wall segments by upwardly extending wall portions which serve to provide a mechanical advantage when compressing the flanges toward one another thus reducing the amount of pressure necessary to urge the wall segments toward one another to thereby facilitate the insertion or withdrawal of the inner clamp member relative to the outer clamp member.

In one embodiment of the present invention, the outer clamp member includes a base portion having an elongated channel formed therein in which cards or other indicia bearing material may be placed to indicate the contents of the bag being sealed or, in the alternative, in which specially shaped magnets may be placed so as to allow the attachment of the sealing device to a metallic surface.

In another embodiment, a plurality of sealing assemblies are selectively retained in tracks which are secured to cabinets or walls.

2. History of the Related Art

At some point in time almost everyone is confronted with the necessity to seal bags, packages or containers which have been opened in order to access the contents thereof. Once some packages have been opened, such as packages for distributing food products, the food products may deteriorate or lose their freshness if left exposed to ambient conditions. At other times, it may be necessary to seal products which may have already deteriorated or which may have offensive odors so that such items may be retained for disposal or future use. Another instance wherein sealing of the contents of bags is important is when food products are enclosed within bags for freezing. Such enclosures must be completely sealed to prevent the escape of moisture from the products as they are frozen.

Although bags are currently available which have integrally formed locking mechanisms or seals, there are many types of bags and other receptacles which are not designed to be self-sealing and therefore must be sealed utilizing mechanical closures. In some instances, people have used paper and other office supply clips, rubberbands and the like to facilitate the closing of bags, however, such closures do not seal the contents of bags even in those instances where the upper edges of the bags are folded over upon themselves to form lapped seams. To obtain not only a closing of flexible wall bags or containers but a sealing of the contents thereof, various mechanical clamps have been designed which utilize inter-engaging components which compress the upper edges of the bag therebetween.

In U.S. Pat. No. 3,141,221 to Faulls, Jr., several types of closures for sealing flexible bags are disclosed wherein a yieldable open channel member is provided into which a yieldable insert member is cooperatively seated. The patent discloses that the closure members may have varying cross sections and shows the use of semi-cylindrical closure members and triangular closure members. In use, the upper edges of a bag are placed within the open channel member and thereafter the insert member urged therein to compress the upper edges of the bag against the inner walls of the channel member. Other engagements are made by sliding the outer channel member over the edges of a bag which are draped over the insert member. In either case, the difficulty with such closure devices is that they are often difficult to assembly and disassemble, especially when utilizing the snap-fitting of clamping members. In those instances where the clamping members must be longitudinally shifted relative to one another, it is possible that the upper edges of a bag can be damaged, thus making it difficult to reseal a bag in an efficient manner.

In U.S. Pat. No. 3,266,711 to Song, another type of bag closure device is disclosed which incorporates an elongated open channel locking member to which is pivotally attached a compression rod which is seated within the channel to bind the upper edges of a bag therebetween. To allow opening of the clamping members relative to one another in this closure device, it is necessary that the seated rod extend beyond the open channel clamping member so that the two members may be pulled apart by utilizing the leverage provided by the extended portion of the rod. However, even with the mechanical advantage offered by the extension of one of the clamping members relative to the other, it is often difficult to retain the open channel clamping member in a fixed position while pulling the rod therefrom and thus some individuals have difficulty in separating the members once they have been placed in locked relationship with respect to one another.

In U.S. Pat. No. Des. 301,548, a clamping assembly similar to that of Song is disclosed wherein a hook is provided extending from the end of the rod member which is seated within the open channel of the outer clamping member in order to allow an individual to obtain an additional grip to disengage the components. In this apparatus, the base clamping member is also provided with flanges along its length to further allow an individual to grasp the opposing clamping members to facilitate their separation.

Additional examples of interlocking yieldable bag closure devices are disclosed in U.S. Pat. Nos. 3,621,539 to Ayers and 4,534,089 to Swan.

SUMMARY OF THE INVENTION

This invention is directed to mechanical closures for sealing opposing sheets of flexible material and particularly opposing walls of a receptacle such as a bag wherein the closures include elongated outer clamp members having a pair of wall portions which are spaced from one another and which are yieldable with respect to one another and which define an open channel therebetween into which an inner clamp member may be selectively inserted so as to compress and retain the edges of a bag or other flexible material therebetween. In some embodiments, the outer clamp member includes a base portion from which the opposing wall segments extend and which base portion includes a channel into which either a magnetic material may be inserted so that the outer clamp member may be supported on a metallic surface or, an indicia bearing card may be inserted so as to identify the contents and other information relating to what is packaged within a sealed container. In some embodiments, the base portion may be formed of a transparent plastic material so that indicia may be read therethrough or, in other embodiments, openings may be provided through the base through which indicia may be displayed.

Each outer clamp member further includes a pair of elongated upper edges which flare outwardly from the open channel so as to facilitate the elastic separation of the opposing wall segments during the insertion of the inner clamp member with respect to the open channel of the outer clamp member.

Each inner clamp member includes a pair of opposing and resiliently yieldable wall segments which may be compressed utilizing outwardly spaced flanges which are integrally formed therewith. The flanges are spaced outwardly with respect to the wall segments so that a distinct mechanical advantage is obtained when compressing the flanges towards one another to reduce the effective cross section of the inner clamp member and thus facilitate its insertion into the open channel defined by the outer clamp member.

In another embodiment, the sealing assemblies may be used with tracks which are designed to support a plurality of assemblies from a cabinet, shelf or wall. The tracks include elongated channels into which the base of the outer clamp members are inserted. The tracks may include a flange which is engageable to spread the track members to facilitate the mounting or removal of the sealing assemblies with respect thereto.

It is the primary object of the present invention to provide a mechanical closure for sealing bags and other flexible materials wherein an inner clamp member may be manually compressed about its axis to facilitate its insertion into the open channel of an outer clamp member utilizing minimal force applied to outer flanges associated therewith so that the clamp members may be assembled after which the inner member is allowed to expand outwardly to seal and retain the bags or other materials between the clamp members.

It is also an object of the present invention to provide a mechanical seal for closing bags and related flexible wall containers wherein the seal may be utilized to facilitate the identification and other information regarding the contents of such containers by allowing indicia to be carried by the seal.

It is also an object of the present invention to provide a mechanical closure and sealing device for flexible containers wherein a portion of the device may support a magnetic material which thereby permits the device to be supported by magnetic attraction to metallic surfaces.

It is yet a further object of the present invention to provide a mechanical closure and seal utilizing elongated interfitting clamp members wherein the material to be sealed will be subjected to less frictional wear and tear between the clamp members by allowing the inner clamp member to be effectively seated within the outer clamp member with minimal sliding friction therebetween.

It is another object of the present invention to provide clamping and sealing assemblies which may be used as an item organizing and/or storage system by providing tracks which are securable to walls, cabinets, shelves and the like, and which are designed to selectively support a plurality of assemblies therein.

BRIEF DESCRIPTION OF THE DRAWINGS

FIG. 1 is a perspective illustrational view of the bag closure and sealing device of the present invention having the upper edges of the bag sealed between the inner and outer members thereof.

FIG. 2 is a partial bottom plan view taken along lines 2—2 of FIG. 1 showing indicia being readable through the base of the closure device.

FIG. 3 is an enlarged cross-sectional illustrational view taken along lines 3—3 of FIG. 1 showing the insertion of a magnet within the channel formed in the base of the outer clamp member and further showing the relationship between the compression flanges associated with the inner clamp member relative to the opening therein.

FIG. 4 is a partial right side elevational view of the closure and sealing device of FIG. 1.

FIG. 5 is an enlarged partial perspective view of an alternate embodiment of the present invention in which the bag closure and sealing device is supported by a mounting track.

DESCRIPTION OF THE PREFERRED EMBODIMENTS

Figure 6:
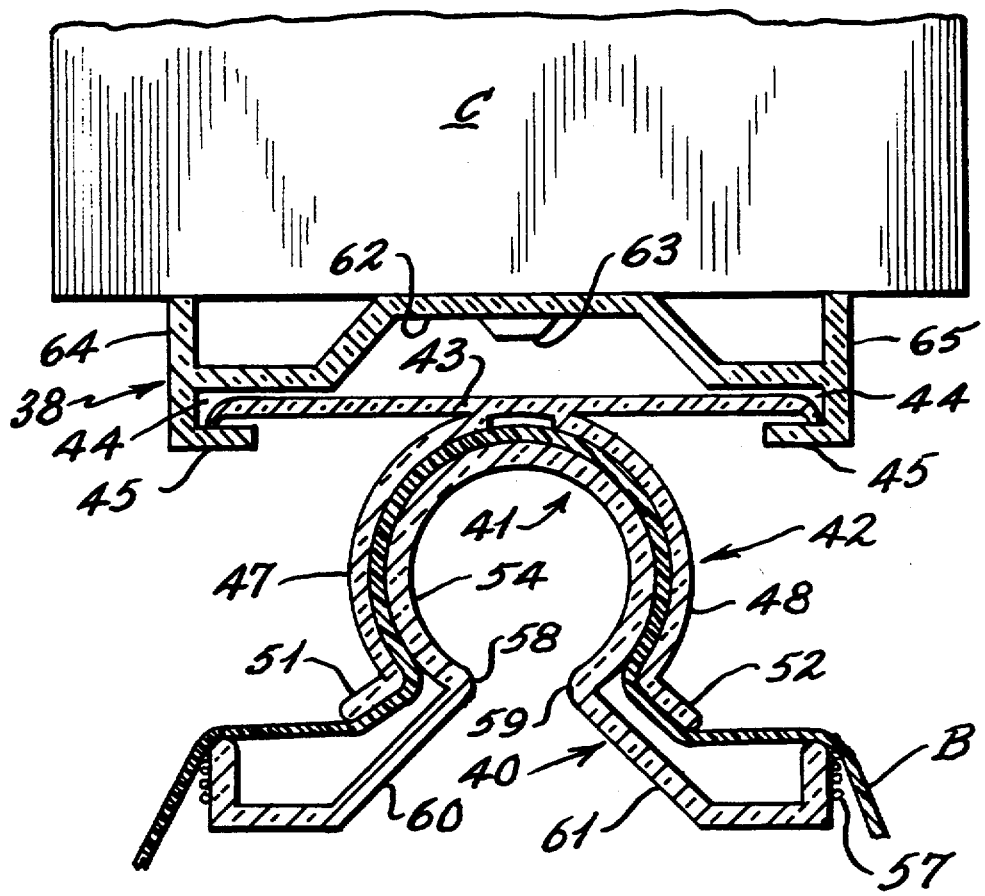
FIG. 6 is a cross-sectional view taken along lines 6—6 of FIG. 5.

With continued reference to the drawings, a first embodiment of bag closure and sealing device 10 of the present invention is shown as including inner and outer clamp members 11 and 12. The outer clamp member 12 includes a base portion 13 which defines an elongated open channel 14 into which either an indicia bearing card 15 may be inserted, such as shown in FIG. 2, or into which a magnetic element 16 may be inserted, as shown in FIG. 3. In some embodiments both the magnet 16 and the indicia bearing card 15 may be used together. By allowing the magnetic material to be retained within the channel 14, the entire closure and sealing device may be mounted from a metallic surface such as a side wall of a refrigerator or freezer. This allows support of the device on a vertical wall surface which would not otherwise be possible utilizing conventional bag closure devices. The use of the indicia bearing card 15 allows the contents of a bag B being sealed to be identified with the date of closure or with an effective date for disposal.

With particular reference to FIG. 3, the outer clamp member 12 includes a pair of opposing wall segments 17 and 18 which are integrally formed with one another and with the base 13. The opposing wall segments 17 and 18 are shown as being generally arcuate in configuration in the embodiment disclosed however, other configurations may be used and be in keeping with the teachings of the present invention. For instance, V or diamond shaped cross sections may be utilized which are open along the top and which define a channel between the side walls or segments.

The side walls also define an elongated channel 20 therebetween which is generally of a first diameter or maximum spacing. The clamp members are formed of a plastic material so that the opposing wall segments thereof may be flexed and are resiliently yieldable relative to one another. To facilitate the insertion of the inner member 11 within the outer clamp member 12, the upper edges of the opposing wall segments 17 and 18 of the outer clamp member include outwardly flared portions 21 and 22 which are engageable by the inner clamp member to facilitate the separation of the wall segments 17 and 18. In order to seal the opposing sheets of the bag B between the inner and outer clamp members, as shown in FIG. 3, one or more elongated ribs 23 may be provided which extend inwardly from the side wall segments 17 and 18 which ribs pinch the sheets together and thereby prevent any escape of fluid from the bag along the line of the seal. Alternatively, the ribs may be provided along the length of and extending outwardly of the inner clamp member.

The inner clamp member includes an elongated body portion defined by opposing wall segments 24 and 25 which are of a configuration so as to cooperatively seat with and engage the wall segments 17 and 18 of the outer clamp member. In this respect, in the drawing figures, the wall segments 24 and 25 are generally arcuate and are shown as being integrally formed with respect to one another. As previously mentioned, the wall segments could be of different configurations so long as they cooperatively abut and conform with the outer wall segments 17 and 18 of the outer clamping member.

The diameter or maximum width defined by the outer surface of the wall segments 24 and 25 is essentially equal to the diameter or width defined by the elongated channel 20 between wall segments 17 and 18 of the outer clamp member. It is generally preferred that the inner member be slightly larger so that a compressive force is created between the inner and outer clamp members when they are engaged, as shown in FIG. 3.

To facilitate the insertion and removal of the inner clamp member 11 within the outer clamp member 12, the inner clamp member is provided with a pair of opposing finger grip flange elements 26 and 27 which extend outwardly on either side of the inner and outer wall segments 24 and 25 and 17 and 18. The flanges are oriented generally above the channel 20 defined within the outer clamp member and are parallel with respect to a vertical plane extending through the sealing device so that a distinct mechanical advantage may be obtained when the flanges are compressed toward to one another to close wall segments 24 and 25 relative to one another thereby reducing the effective cross-sectional area or diameter of the inner clamp member so that less friction is encountered when assembling or disassembling the clamp members. The flanges 26 and 27 are connected to the upper edges 28 and 29 of the opposing wall segments 24 and 25 of the inner clamping member by upwardly and outwardly extending integrally formed connector walls 30 and 31. To facilitate manual gripping of the flanges 26 and 27, a plurality of small longitudinally extending ribs 32 and 33 may be integrally molded on the outer surfaces thereof. In some embodiments, the flanges may extend down toward the base of the outer clamp member to a greater or lesser degree than is disclosed in the drawing figures, however, a mechanical advantage is obtained by allowing the flanges to be engaged in an area above the opening into or between the wall segments 24 and 25 of the inner clamp member. In some embodiments, the flanges may extend upwardly away from the base 13 as opposed to their orientation toward the base in the preferred embodiment.

It should further be noted that the base 13 is constructed so that the wall segments thereof extend outwardly generally into alignment with the flanges 26 and 27 so that the base may be easily grasped in one hand as the flanges 26 and 27 are grasped with the fingers of another hand thus allowing greater dexterity in pulling the units apart.

In use, the upper walls of a bag B are inserted within the channel 20 so that the top portion of the bag extends over one of the outwardly extending portions 21 and 22 thereof and thereafter the inner clamp member is inserted within the outer clamp member as is shown in FIG. 3. During the engagement of the components, the flanges 26 and 27 of the inner clamp member are engaged and urged toward one. This movement will compress the wall segments 24 and 25 towards one another thereby effectively reducing the diameter or cross-sectional configuration of the inner clamp member so that it may be easily inserted or removed with minimal frictional resistance with the opposing wall segments 17 and 18 of the outer clamp member. Once the inner clamp member has been inserted within the outer clamp member, the pressure may be relieved from the flanges 26 and 27 thereby permitting the inner clamp member to expand against the bag and into compressed engagement with the outer clamp member. During assembly of the components, the outwardly extending wall portions 21 and 22 will further assist in spreading the wall segments 17 and 18 of the outer clamp member as the inner clamp member is introduced into the channel 20.

It is preferred that the clamp members of the present invention be formed of a plastic material which may be extruded into different lengths to facilitate the closure of bags of different widths. The plastic from which the base 13 of the outer clamp member 12 may be transparent so that the indicia card 15 may be seen therethrough. In other embodiments, openings or windows may be provided within the lowermost wall of the base 13 through which the indicia card 15 may be displayed.

With reference to FIGS. 5 and 6, another embodiment of the invention is disclosed in greater detail. In this embodiment the bag closure and sealing device 40 is shown as being selectively carried by a track assembly 38. The track assembly is designed to be installed beneath a counter, cabinet or other wall surface as will be described in greater detail hereinafter. The bag closure and sealing device 40 includes inner and outer clamp members 41 and 42. The outer clamp member 42 includes a base portion 43 which is of a configuration to be slidingly received within opposing channels 44 defined by opposing flanges 45 of the track assembly 38. The outer clamp member 42 includes a pair of opposing wall segments 47 and 48 which are integrally formed with the base 43. The opposing wall segments have the same configuration as discussed above with respect to the embodiment of FIGS. 1–4 however such configuration may vary. The wall segments 47 and 48 define an elongated open channel therebetween which is a size to receive the inner clamp member 41. To facilitate the insertion of the inner clamp member 41 within the outer clamp member 42, the upper edges of the opposing wall segments 47 and 48 of the outer clamp member include outwardly flared portions 51 and 52.

The inner clamp member 41 includes an elongated body portion defined by opposing wall segments 54 and 55 which are of a configuration to be cooperatively seated within the channel defined between the wall segments 47 and 48 of the outer clamp member. The relative sizes and configurations of the inner and outer clamping members 41 and 42 are generally the same as discussed with respect to the embodiment of FIGS. 1–4. To facilitate the insertion and removal of the inner clamp member within the outer clamp member, the inner clamp member is provided with a pair of opposing finger grip flange elements 56 and 57 which extend outwardly on either side of the inner and outer wall segments 54 and 55 and 47 and 48 of the outer and inner clamp members. The flanges may be engaged and urged towards one another thereby compressing the inner clamping member to facilitate its insertion or removable relative to the outer clamp member in a manner as has been previously discussed. The flanges are connected to the upper edges 58 and 59 of opposing wall segments 54 and 55 of the inner clamp member by upwardly and outwardly extending integrally formed connector walls 60 and 61. As with the previous embodiment, to facilitate manual gripping of the flanges of 56 and 57, a plurality of small longitudinally extending ribs which may be integrally molded on the outer surface thereof. Although the flanges are shown as being extended upwardly toward the track assembly 38, it should be noted that the flanges may extend away from the track assembly 38.

The track assembly 38 includes a recessed base portion 62 which is spaced from the channels 44 so as to provide clearance for screws or other fasteners 63 to be utilized to secure the track assembly beneath an overhanging structure such as a cabinet "C". The track assemblies further include generally parallel side walls 64 and 65 having elongated edges which abut the under surface of the cabinet "C" and further stabilize the track assembly with respect thereto.

In the embodiment of the invention disclosed in FIGS. 5 and 6, the bag closure and sealing assemblies 40 may be utilized to mount one or more bags B from a given track. As opposed to having the track assembly extend the same distance as the closure assembly 40 the track assembly 38 may extend two, three or four feet in length thereby allowing a plurality of bag closure and sealing assembly 40 having lengths varying up to approximately one foot to be supported by the track assemblies. Therefore, in this embodiment, the invention may be utilized as an organizer to support a plurality of given items from a support structure. The invention may be utilized in garage areas or workshops to organize various components such as fasteners, electrical parts, miscellaneous hardware items and even seeds and bulbs for gardening. In use, once a bag has been sealed within the clamping members of the bag closure and sealing device 40, the device is simply inserted within the opposing channels 44 of the track assembly and thereby retained in suspended relationship with respect to a support structure such as a cabinet. It should be noted that the track assembly may equally be supported to a vertical wall surface and provide the same advantages as discussed above with respect to overhanging structures such as the bottom surface of a shelf or cabinet.

Figure 7:
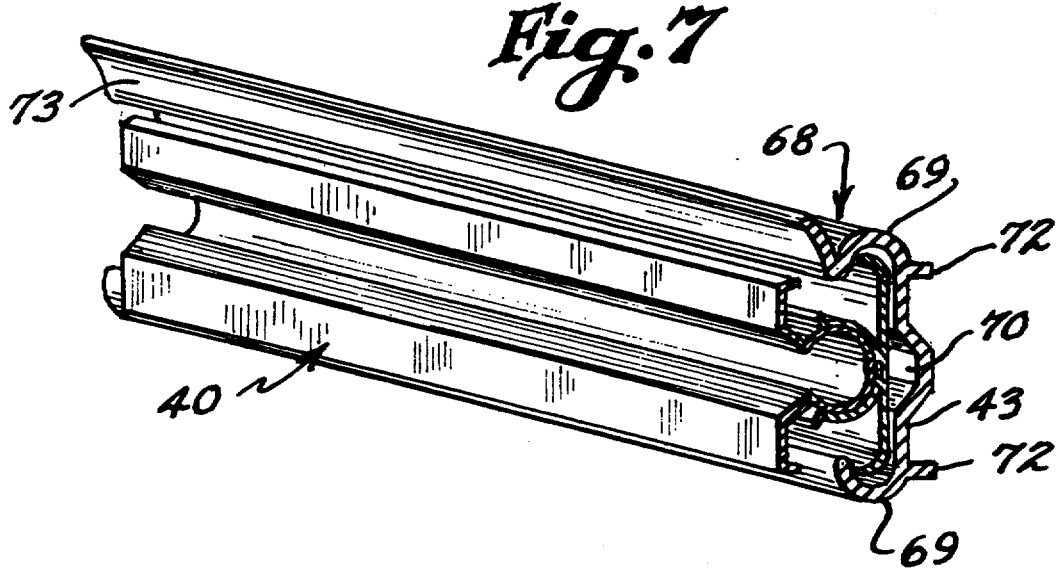
FIG. 7 is a perspective view of the bag closure and sealing device of FIG. 5 supported by a modified mounting track.

With specific reference to FIG. 7 another embodiment of the invention is disclosed which incorporates a modified track assembly. In the embodiment of FIG. 7, the bag closure and sealing assembly 40 is generally the same structure as discussed above with respect to FIGS. 5 and 6. The track assembly 68 includes a pair of opposing generally arcuate curved channels 69 which are connected by a recessed base portion 70. A pair of elongated side wall members 71 and 72 extend generally parallel to the base and are provided for stabilizing the track assembly against a supporting surface such as a wall. The track assembly is connected to the wall by utilizing suitable fasteners such as screws (not shown).

In this embodiment, the upper channel member includes an upwardly and outwardly extending elongated flange 73 which is integrally molded with the track assembly. As the track assembly is formed of slightly yieldable plastic material, by exerting a force against the elongated flange the upper channel may be spaced relative to the lower channel thereby allowing the base 43 of the outer clamp member to be pulled directly outwardly from to the track assembly as opposed to being slidingly removed from the track assembly as is necessary with the embodiment shown in FIGS. 5 and 6. In this embodiment, a plurality of clamp and sealing assemblies 40 may be easily inserted within an elongated track 68 without having to slide a plurality of assemblies from the track in order to as would be necessary in the embodiment disclosed in FIGS. 5 and 6. Further, to insert a clamp and sealing assembly 40 within the track assembly 68, pressure is applied to the elongated flange 73 opening the space between the opposing channels and allowing the base portion 43 of the outer clamp member to be seated therebetween, after which, the pressure is relieved from the flange allowing the upper flange to close relative to the base portion of the outer clamp member.

I claim:

1. A mechanical bag closure and sealing assembly comprising, an outer clamp member having a base portion from which a pair of opposing wall segments extend so as to define an open channel therebetween, said wall segments having outwardly inclined upper flanges and being resiliently yieldable relative to one another, an inner clamp member having a body portion defined by opposing wall segments of a size and configuration to be cooperatively seated within said channel and being resiliently yieldable relative to one another, an elongated opening defined between said opposing wall segments of said inner clamp member, a pair of outwardly extending compression elements integrally formed with said opposing wall segments of said inner clamp member, each of said compression elements including a flange portion, said flange portions being oriented in opposing generally parallel relationship with respect to one another whereby when said opposing flange portions are engaged and compressed towards one another, said opposing wall segments of said inner clamp member are resilient urged toward one another to thereby facilitate the insertion and removal of said inner clamp member within said channel.

2. The mechanical bag closure and sealing assembly of claim 1 in which said opposing flange portions of said compression elements are spaced outwardly of said opposing wall segments of said outer clamp member and are oriented in spaced relationship with respect to an elongated axis defined by said channel.

3. The mechanical bag closure and sealing assembly of claim 2 in which said base portion of said outer clamp member includes an elongated channel, and indicia bearing means slidably receivable within said elongated channel.

4. The mechanical bag closure and sealing assembly of claim 2 in which said base portion of said outer clamp member includes an elongated channel, and magnetic means mounted within said elongated channel.

5. The mechanical bag closure and sealing assembly of claim 2 including at least one elongated rib integrally formed with one of said inner and outer clamp members which extends outwardly in opposing relationship to the other one of said inner and outer clamp members.

6. The mechanical bag closure and sealing assembly of claim 1 including at least one elongated rib integrally formed with one of said inner and outer clamp members which extends outwardly in opposing relationship to the other one of said inner and outer clamp members.

7. The mechanical bag closure and sealing assembly of claim 1 including a track assembly, said track assembly including a base and a pair of opposing and spaced channels, said base portion of said outer clamp member being selectively receivable within said opposing channels.

8. The mechanical bag closure and sealing assembly of claim 7 including an elongated flange extending from one of said channels, said elongated flange being engageable to urge said channels away from one another.

9. The mechanical bag closure and sealing assembly of claim 7 in which said track assembly includes a pair of spaced side walls which extend outwardly on opposite sides of said base.

10. The mechanical bag closure and sealing assembly of claim 7 in which said base is recessed relative to said channels, and fastener means extending through said base.

11. A combination mechanical bag closure and track assembly comprising, a sealing means including an outer clamp member and an inner clamp member, said outer clamp member having a base portion from which a pair of opposing wall segments extend so as to define an open channel therebetween, said wall segments having outwardly inclined upper flanges and being resiliently yieldable relative to one another, an inner clamp member having a body portion defined by opposing wall segments of a size and configuration to be cooperatively seated within said channel and being resiliently yieldable relative to one another, an elongated opening defined between said opposing wall segments of said inner clamp member, a pair of outwardly extending compression elements integrally formed with said opposing wall segments of said inner clamp member, said opposing wall segments of said inner clamp member being resiliently urged toward one another to thereby facilitate the insertion and removal of said inner clamp member within said channel, a track assembly having a pair of spaced opposing channels, and said base portion of said outer clamp member being receivable within said opposing channels to thereby mount said sealing means to said track assembly.

12. The combination of claim 11 in which said track assembly includes an elongated flange extending outwardly with respect to one of said opposing channels, said elongated flange being selectively engageable to urge said channels away from one another.

13. The combination of claim 11 including a plurality of sealing means mounted to said track assembly.

14. The combination of claim 12 including a plurality of sealing means mounted to said track assembly.

15. The combination of claim 11 in which said track assembly includes a base recessed relative to said opposing channels, and side walls extending on opposite sides of said base for stabilizing said base relative to a support surface.

16. The combination of claim 12 in which said track assembly includes a base recessed relative to said opposing channels, and side walls extending on opposite sides of said base for stabilizing said base relative to a support surface.

17. The combination of claim 11 in which each of said compression elements including a flange portion, said flange portions being oriented in opposing generally parallel relationship with respect to one another whereby when said opposing flange portions are engaged and compressed towards one another.

18. The combination of claim 12 in which each of said compression elements including a flange portion, said flange portions being oriented in opposing generally parallel relationship with respect to one another whereby when said opposing flange portions are engaged and compressed towards one another.

19. A combination mechanical bag closure and track assembly comprising, a plurality of sealing means, each sealing means including inner and outer clamp members, said outer clamp member having a base portion from which a pair of opposing wall segments extend so as to define an open channel therebetween, said wall segments having outwardly inclined upper flanges and being resiliently yieldable relative to one another, an inner clamp member having a body portion defined by opposing wall segments of a size and configuration to be cooperatively seated within said channel and being resiliently yieldable relative to one another, an elongated opening defined between said opposing wall segments of said inner clamp member, a pair of outwardly extending compression elements integrally formed with said opposing wall segments of said inner clamp member, each of said compression elements including a flange portion, said flange portions being oriented in opposing generally parallel relationship with respect to one another whereby when said opposing flange portions are engaged and compressed towards one another, said opposing wall segments of said inner clamp member are resilient urged toward one another to thereby facilitate the insertion and removal of said inner clamp member within said channel, a track assembly including a pair of opposing channels, and said sealing means being selectively receivable within said opposing channels.

20. The combination of claim 19 in which said track assembly includes an elongated flange extending outwardly with respect to one of said opposing channels, said elongated flange being selectively engageable to urge said channels away from one another.

* * * * *